UNITED STATES PATENT OFFICE.

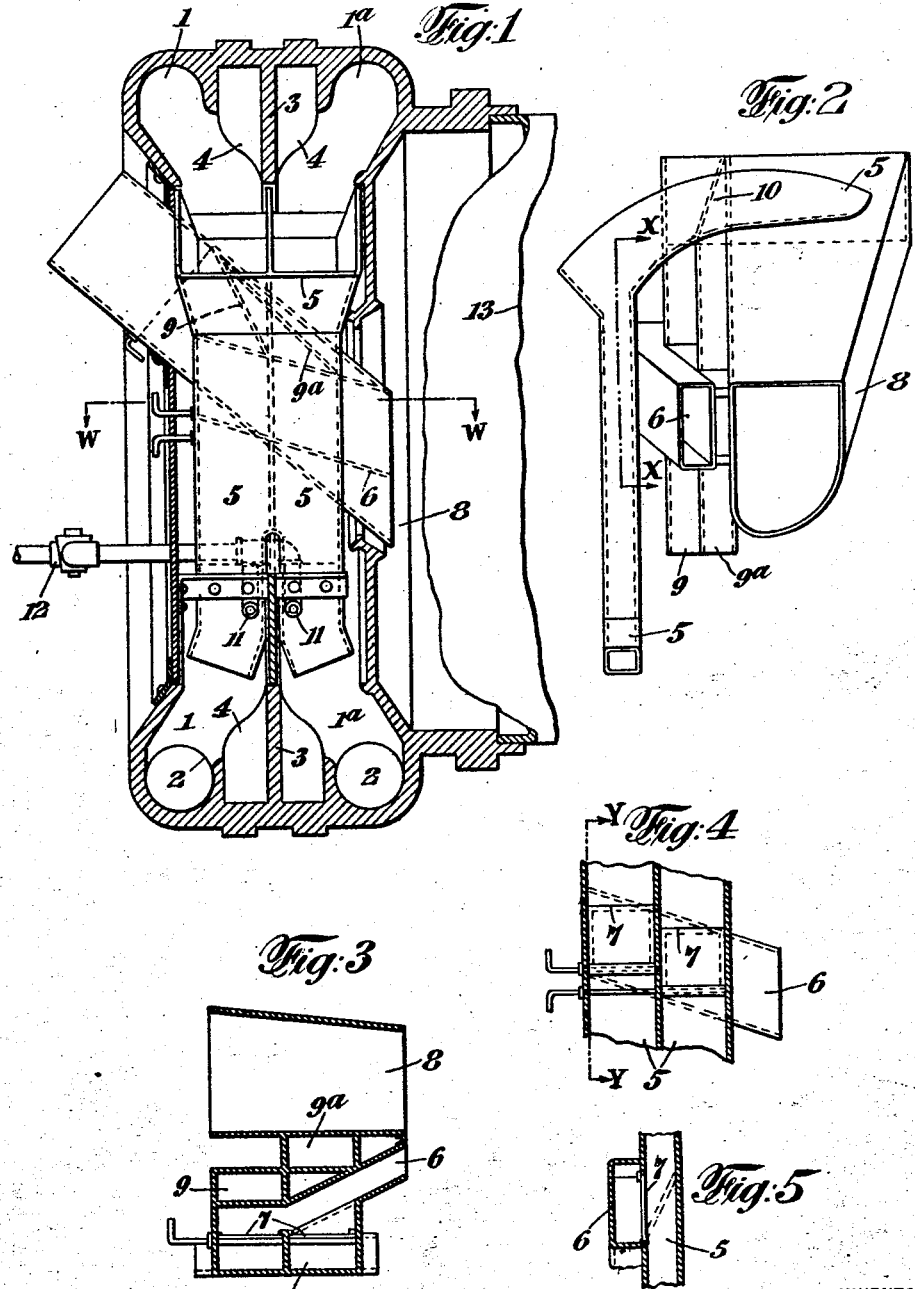

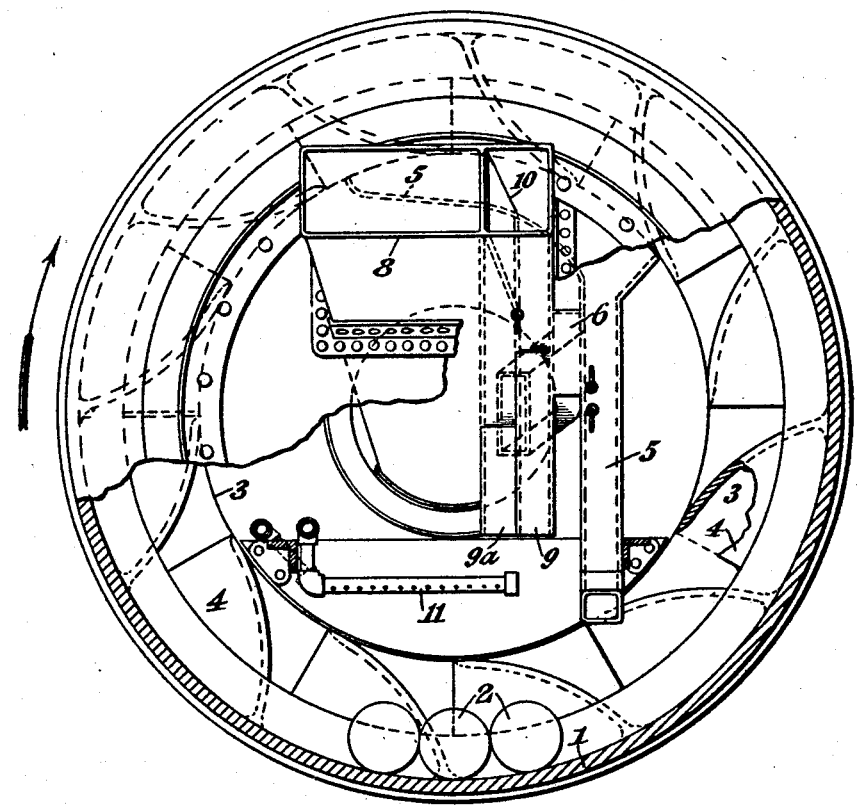

CLOYD M. CHAPMAN, OF DOUGLASTON, NEW YORK, AND NATHAN C. JOHNSON, OF ENGLEWOOD, NEW JERSEY; SAID CHAPMAN ASSIGNOR TO SAID JOHNSON.

METHOD OF MAKING MIXTURES WITH WATER-REACTING CEMENT AND CEMENT PRODUCT.

1,259,462.  Specification of Letters Patent.  Patented Mar. 12, 1918.

Application filed February 23, 1917. Serial No. 150,367.

*To all whom it may concern:*

Be it known that we, CLOYD M. CHAPMAN, a citizen of the United States, and a resident of Douglaston, county of Queens, and State of New York, and NATHAN C. JOHNSON, a citizen of the United States, and a resident of Englewood, county of Bergen, and State of New Jersey, have invented certain new and useful Improvements in Methods of Making Mixtures with Water-Reacting Cement and Cement Products, of which the following is a specification.

Our invention relates to methods of making mixtures with water-reacting cement, and to cement products.

Our invention provides for a quick and also a very thorough hydration of the cement, and in the case of the mixing of concrete, it provides for a marked degree of hydration of the cement before being mixed with the aggregate or aggregates of the concrete.

By the term "cement" we mean to include not only those products obtained by the sintering and grinding of a mixture of calcareous and argillaceous materials which are commonly known as Portland cements, but also those cements obtained by the calcination of natural rock such as what is known as Rosendale cement and other natural cements capable of reacting with water. While the invention comprises generally the making of mixtures with water-reacting cement, it is of special utility in the making of concrete because it insures a very thorough adhesion of the cement—the binding agent—to the aggregates of the concrete, which adhesion is very incomplete under present practice, as will hereinafter more fully appear.

Under the term "concrete" we include a mixture of water-reacting cement and water with any suitable aggregate or aggregates such for example as sand or sand and stone, etc., except where hereinafter more specifically limited.

The objects of the invention are, to provide a ready and efficient method of making cement mixtures; to hasten very greatly, and render far more complete and uniform, the hydration of cement; to avoid the continuance of partly hydrated cement layers enveloping the individual cement particles or aggregations of such particles; to produce a hydrated cement mixture capable of forming, with suitable additions to it, a concrete of far more uniform character and of much greater ultimate strength and density and hardness than has been obtainable previously in reasonably quick setting concretes, and which shall be capable of taking a reasonably quick initial set and of subsequently becoming rigid, and which is substantially free from tendency to subsequent disintegrating actions; and to produce a mixture of cement-hydration products which shall be of such consistency that while it will flow readily it is capable of holding in suspension until initial setting occurs, sand or small rock particles, and shall be of such consistency as to prevent the segregation of the broken rock (commonly added in the formation of concrete) while the concrete is being transported from the mixer to the place of deposition or while the concrete is being poured or is lying *in situ* after pouring.

In the making of concrete it is an economic essential that a substantial output shall be had in a relatively short time, and with the present processes and apparatus used for mixing concrete wherein, for example, cement, water, sand and stone are dumped indiscriminately into a rotating drum or other suitable mixer, a sufficient opportunity is not given for a thorough mixing of the cement and water to obtain the desired amount of hydration of the cement. The period of such mixing in commercial work rarely exceeds thirty seconds, because to produce the required amount of concrete in a given time the mixing operation is necessarily brief; and even if a much longer time than this were allowed for the mixing of the combined ingredients of the concrete, the cement would not be as thoroughly hydrated as it will be when treated by and according to our invention. This is due to the following facts: that the particles of cement tend to cohere in small lumps, and this cohesion or lumpy condition is aggravated when the cement is brought in contact with the water, probably by reason of its surface tension forming envelops around these lumps with more or less air at the surface of and within the lumps; that the individual cement particles are not thoroughly wet by the water, the water apparently only wetting and hydrating the outer surface of the individual fine particles, and these fine particles cannot be as readily crushed or the lumps as readily broken up when the cement is mixed with particles coarser than the cement, and particularly when mixed with the coarser aggregates such as broken stone. Furthermore, a certain amount of the cement becomes pocketed between and adheres to the irregular surface of the coarser aggregate such as broken stone, and adheres in more or less thick layers or lumps when the stone is wet before the dry cement reaches it, thus sometimes adhering in lumps and sometimes in films. This prevents ready and thorough intermingling of the individual particles of the cement with the water, because the layers or lumps of cement thus located would not be thoroughly intermingled with the water even after being mixed with this coarser aggregate for a time much longer than could be tolerated in practice, these coarser particles of the aggregate preventing the certain breaking up of any small lumps of cement or attrition of the individual particles of the cement.

Because of these difficulties, cement has not been well hydrated in any of its mixtures having a reasonable setting period, and its hydration has been particularly poor in concrete where coarser aggregates are used such as broken stone. In other words, the present methods and apparatus for making cement mixtures, and particularly in making concrete having a coarse aggregate, result in a very inefficient use of the cement and in an inefficient product. The mixtures have been found lacking in homogeneity, and there has been little or no definite quantitative or positive formation of those substances which result from chemical union of cement and water, and to which substances the resulting mass of concrete owes, both quantitatively and qualitatively, its desirable properties. In fact, it may be said that former commercially used processes and means of uniting sand and stone by means of cement are analogous to an attempt to glue together pieces of wood by wetting the surfaces to be joined and sprinkling on those moistened surfaces powdered cementing substances as, for instance, powdered glue. The hydrated cement of proper concrete is to be considered as of the nature of a "mineral glue," which, like the glue employed in cabinet making, must be uniformly and thoroughly distributed over the surface to be united; and it is not practicable or possible in reasonable time to produce a proper union according to present processes of mixing cement.

Water and cement react to produce a variety of compounds differing more or less in their exact composition, some of which are colloidal or amorphous, while others are crystalloidal; and it has been proved by protracted investigation, and particularly when water in excess is added as is usual in the primary mixing process in making cement concrete, that envelops are formed around the individual particles of cement which become increasingly impervious with the passage of time, and which serve to isolate the individual particles of cement to such a degree as to prevent their proper hydration, save at the surface portion of each particle.

In order that a proper understanding may be had of the actions incident to the hydration of cement, for example Portland cement, it is advantageous to first consider the physical inter-relation of the substances entering into and composing cement concrete.

It is readily conceivable that if a given quantity of pulverized cement and water be stirred together to form a homogeneous mixture, the water must lie between the particles of cement and so separate them one from another. If an excess quantity of water be added to a like quantity of cement, by the same reasoning the particles must be considered as forced still farther apart by the water, possibly to such distances as to be beyond their proper and effective radius of action; it being understood that the bond produced by cement through its reaction with water is due, temporarily at least, to interlacing crystals of various substances, and that a certain concentration of solution, increasing, of course, toward the source, i. e., the surface of each cement particle, is required for the formation of such crystals.

In this condition, which almost universally exists in the making of concrete, the envelop referred to builds up rapidly on the outside of the cement particles until it forms a nearly impervious coating which prevents further hydration. So extensive is this evil that concretes many years old (some concretes as old as fifty years have been examined and this effect observed) show that not over thirty per cent. of the cement is actively used.

It necessarily follows, therefore, that not only is there a great economic loss on account of this unused cement, but further, the sand and stone which it was intended should be coated with hydrated cement, in order that they might cohere, have been deprived of a large portion of the necessary cementitious substance, with consequent detriment to the quality of and endurance of the concrete. Furthermore, it follows that by this ineffective use of cement and its lying inert within the mass, there is a possibility of secondary actions being set up through the later introduction of water into the mass (either by capillary action in pores or by that species of membraneous transfer known as "osmotic action") between this unused cement in the rigid mass and the entrant water, with production of stresses of indeterminate magnitude and character. Such secondary actions, if they occur, are in general of the nature of further crystallization, which, as well known, is often accompanied by expansion. It is very well known that the stresses capable of being imposed upon concrete by physical loading are minor as compared with stresses due to the formation of secondary compounds of an expansive crystalline nature.

It is easy to see, therefore, that it is advantageous that all particles of the cement shall be brought into contact with water, and that hydration shall be well advanced before the concrete has taken its initial set. We do not mean that the hydration should be absolutely complete; for it is commonly considered that for best results, the cement portion of concrete should have, after full setting, some capacity for further very slow hydration; which further slow and quantitatively slight hydration may extend through a period of years. Such small and slow hydration, however, does not produce secondary actions such as above referred to, to such an extent or of such magnitude as to set up excessive internal stresses, being apparently of a different nature and limited by the chemical necessities of the surrounding cement mass.

It will be seen, therefore, that in the making of concrete it is of fundamental importance to so initially incorporate the cement and water that there shall be adequate chemical union between them. The result of such a fairly thorough hydration is what may be termed a "mineral glue" by which the sand and stone of the concrete may be coated and firmly and unalterably bound together.

In the making of concrete the most important consideration is that a thorough hydration of the cement be secured, and the consideration of next importance is the time and cost of mixing the concrete. We have found that to obtain the desired hydration there must be a much more positive and thorough mixing of the cement particles with the water than has heretofore been had, and that the desired degree and character of mixing is difficult, if not impossible to attain in practice within a reasonable time once the coarser aggregate or aggregates, such as broken stone, are mixed with the cement, because of their bulk and interference with the free intermingling of the individual particles of the cement with the water, as heretofore mentioned.

As a method, our invention in one aspect comprises hydrating the cement in the utilization of the same preliminary to its setting, by energetic attrition of the cement in the presence of water, as for example, by forceful or heavy grinding of the wet cement particles. In another aspect, the invention comprises the making of concrete by first obtaining a liquid cement mixture capable of taking a reasonably quick set, and in which the cement is hydrated to a marked degree, and then mixing it with fine and coarser aggregates such as sand and stone. The invention further comprises as a product a moldable mixture and the resulting product hereinafter described; and the invention will be more particularly pointed out in the appended claims.

Further objects and advantages of the invention will more fully appear from the following description taken in connection with the accompanying drawings illustrating one form of apparatus for mixing cement according to our invention.

The preferred manner of carrying out our invention is as follows: The cement without any substance of coarser particles is placed in a suitable hydrator and the water applied thereto in sufficient quantity to insure the desired thorough hydration and creamy consistency described, but preferably not substantially in excess of this, and the mixture of water and cement during or after the bringing together of the water and cement, is thoroughly mixed by being subjected to energetic or violent attrition, as for example by forceful or heavy grinding, so as to break up any lumps or envelops that are formed in the mixture, by grinding the lumps to pieces. and so as to grind off the wet or hydrated surfaces or envelops and break up the individual particles of the cement, thus presenting a new and unhydrated surface to the action of the water, and so on until the cement is thoroughly mixed and ground down with the water so that it thoroughly unites with the water, forming what we might term a "mineral glue." This attrition of the cement is preferably continued until the cement is hydrated to a marked degree or even until it is substantially thoroughly hydrated.

It cannot be said that cement, when hydrated according to heretofore known methods and apparatus, is subjected to energetic or violent attrition. Such methods and apparatus for hydrating cement and mixing concrete fall far short of subjecting cement to energetic or violent attrition. For example, the well known comparatively slowly rotating conveying screws, the relatively slow rotating stirring paddles, the rotating scoops for scooping up a cement mixture from the sides of a mixer and turning it over toward the center, the mixing of concrete by conveying batches of it to a height or the mixing of it at a height, and in both cases discharging it down a chute, as well as the ordinary hand stirring of cement mixtures and the turning over or mixing of concrete manually by shovels, all fall far short of subjecting the same to the desired energetic or violent attrition, and we do not use the term as covering the character of unreliable treatment or mixing to which cement is subjected by such processes and apparatus.

From our experience, under present practice as far as we can ascertain, cement hydrated according to present methods is from ten to forty per cent. completely hydrated, so that, as compared with the present hydration obtained in cement mixtures, hydration from fifty to ninety per cent. of complete hydration would be regarded as a marked degree of hydration; and while, to obtain the full advantages of our invention, hydration should be carried to within the latter limits, yet obviously considerable advantage of the invention may be obtained by a lesser degree of hydration, that lesser degree being obtained according to our invention within a shorter time than is possible under previous methods of hydration. While to obtain a thorough degree of hydration in the shortest possible time and with a relatively light and small hydrator, it is preferable to subject the cement and water mixture to energetic attrition without the presence of any coarser-grained substance, such as sand, obviously certain benefits of our invention will be obtained where sand is present in the mixture, but the presence of sand interferes considerably with the rapid and thorough hydration of the cement; and the presence of coarser particles in quantity, such as broken stone as an aggregate, would prevent the attainment of the objects of the invention.

After the hydration of the cement has been accomplished as described, it is of cream-like fluidity and consistency, the characteristics of which will be hereinafter more fully described; and this is then mixed with the sand and stone in any suitable mixer. In producing our product, the chemical processes of the union between the cement and water are hastened by the more complete and intimate mixture of water and cement particles caused by attrition, such as the heavy mechanical grinding of the cement in water, the result of which is that the outside envelops that would otherwise be formed as described, are detached or broken up, and fresh cement surfaces are brought into contact with the reacting water, heavily charging the solution with the desirable products of hydration and forming the desired "mineral glue" capable of thoroughly coating the sand and stone particles of the concrete mixture and of producing a concrete of superior strength and permanence. The resulting product thus hydrated, in the presence of no undue excess of water, is a smooth, uniform, freely-flowing but somewhat viscous liquid material, readily distinguishable from the exceedingly harsh ununiform liquid cement mixture produced by former commercial methods of hydrating cement. In addition to these qualities of the liquid cement produced by our process as above pointed out, our process produces what may be called a "heavy bodied" grout. The term "grout" as ordinarily used signifies a mixture of Portland cement and water, or of these two substances mixed with sand, but without regard to degree of hydration. It is notable with respect to grouts as formed commercially heretofore, that there is separation, or segregation of particles, according to their size and gravity, there being no true solution present except to a minor degree, and the particles being essentially unattached to one another and unsupported in the solution. Further, such an admixture of cement and water with sand is incapable of supporting the sand particles in suspension, so that they segregate or fall to the bottom in obedience to the law of gravity. Furthermore, such a mortar of cement, water and sand is incapable of supporting in suspension the particles of stone, so that there is further segregation in obedience to the same law. It is obvious that concrete, to possess the properties on which it depends for strength, must be an even mixture of all of its constituent materials; and it has been proven time and again that one of the sources of weakness of concrete, as commonly made, is that the segregation referred to produces pockets of stone practically free of cement, pockets of sand in the same condition, and pockets of cement free of sand and stone. Of course, a concrete in which such segregation exists is an inferior product. The product of our process is, in fact, possessed of such body that it will hold in suspension for very considerable periods of time (and in fact until and after initial setting has occurred) the sand and smaller stone particles which are mixed with such hydrated cement in the formation of grout, or concrete; and the larger masses of broken stone also mixed with such hydrated cement in the formation of concrete are held in suspension by this grout made from sand and the creamy mass of hydrated cement so that the larger masses of stone do not segregate materially in transporting the concrete mixture from the place of production to the place of pouring, or in the pouring operation, or in the mold or concrete bed or the like into which the concrete mixture is poured, prior to setting.

The result of the high degree of hydration produced by our process is a mixture of the colloidal or amorphous and crystalloidal products of cement hydration in combined aqueous solution and suspension, which, as above stated, is of creamy consistency when water is not present in too great excess, and which has the property of taking an initial set within the usual time after production, and of thereafter taking a final set, i. e., of becoming rigid.

By some persons, what we have termed the colloidal products of cement hydration are termed amorphous products; and it is to be understood, therefore, that in this specification the two terms colloidal and amorphous mean the same thing.

It has been known for many years that by prolonged stirring of cement and water a very different substance may be produced from that which is commonly obtained by the simple admixture of the two, with or without very slight stirring, such as has been usual in the making of concrete. This substance, which is flocculent in its nature, and the production of which requires stirring for several hours beyond the period of initial set, is many times greater in volume than that which is obtained by former ordinary commercial methods of hydrating cement in the making of concrete, due both to the greater hydration of the cement, and to the super-production of those substances, largely colloidal, to which Portland cement owes its strength, these colloidal substances drying out with the passage of time to form an amorphous or structureless mass of great density and hardness. But this flocculent material is incapable of taking an initial set, such as is required in the manufacture and placing of concrete, since by the addition of the required excesses of water, the cement particles are separated one from another to distances beyond their reacting radii, this separation being maintained by the mechanical force of stirring, which stirring must be long continued, because of the slowness of reaction between the cement and water when unaccompanied by heavy grinding, as in our process. To utilize its properties it must be slowly dried under pressure. Obviously it is impracticable to use, in most commercial work, a concrete incapable of taking an initial set inside of many days. No matter how excellent the final product might be as a result of the desiccation of the continued colloid, its commercial use is impracticable, if for no other reason than because of the necessity of retaining in place expensive forms in great quantity for long periods of time, or because of the necessity of waiting perhaps weeks for lower members of the resulting structure to obtain sufficient strength and hardness to bear the weight which would be normally imposed upon them by the construction of the upper flights of the structure.

In said process producing the flocculent product, hydration results from long continued contact of cement and great excess of water aided by stirring. It may be stated of our process as compared with that old process, that the element of mechanical grinding of the cement in water has been substituted for the element of long continued contact of the cement and water of the said old process without the dilution incident to the addition of the necessary large excesses of water. However, it is not to be inferred that our product is like the flocculent known product referred to. It differs noticeably from the flocculent product, both in appearance, physical properties, and in the fact that it takes an initial set, sufficient to permit removal of forms, at or within the accustomed time, whereas, as above stated, the flocculent product requires days for consolidation. The creamy product of our process is readily distinguishable from the flocculent product referred to, both in appearance and physical characteristics and by the fact that our product takes an initial set in from one to four hours, depending upon the proportions used, upon temperature, upon the nature of the cement used, and other factors.

We will now proceed to describe the operation of the apparatus shown in the accompanying drawings illustrating apparatus for subjecting the powdered or granular cement to attrition by heavy grinding in water, this present apparatus being in the form of a double ball mill.

In said drawings,

Figure 1 shows a longitudinal vertical section on the plane of axis of the hydrator, an attached mixer drum being shown fragmentarily and partly in vertical section on the same plane and partly in side elevation;

Fig. 2 shows an elevation, from the right of Fig. 1, of the chute system employed for the hydration, and also for the charging and emptying of the hydrating chambers; the hydrating chambers being omitted from this figure;

Fig. 3 shows a horizontal section through the said chute system on the line $w-w$ of Fig. 1, the grinding chambers of the hydrator being omitted;

Fig. 4 shows a vertical section of the chute system on the line $x-x$ of Fig. 2;

Fig. 5 shows a fragmentary transverse vertical section of the chute system, the section being taken on the line $y-y$ of Fig. 4, and shows particularly one of the flap valves employed for the control of the discharge from the grinding chambers; and Fig. 6 shows an elevation and partial vertical section of the hydrator and its chute system, the view being taken from the left of Fig. 1, and the section being taken through the center of one of the grinding chambers.

For reasons hereinafter stated, we utilize a double ball mill as shown, each ball mill proper being similar, in a general way, to simple ball mills, such as are commonly employed for the pulverizing of rock. Such double ball mill comprises two annular ball races 1 and 1ª in which are placed crusher balls 2 or other suitable means whereby, as these ball races are rotated, the materials contained in such ball races will be heavily ground, and thoroughly mingled, and any lumps which may form will be broken up. The two ball races 1 and 1ª are separated by an annular partition 3 provided with projecting scoops or buckets 4, which, as the ball races revolve, pick up the fluid or semi-fluid mass within the ball races, and then, as each scoop or bucket nears the top of the structure, such fluid or semi-fluid material discharges into the corresponding compartment of the double chute 5, the two chute passages of which each conduct such material downward and discharge it, slightly laterally, in front of the crusher balls 2 of the corresponding ball race 1 or 1ª, as the case may be. Thereby the material within the ball races is subjected to the heavy grinding action of the balls 2, with resulting breaking up of any envelops which may form around the individual particles of the cement, as above stated, though the action of the balls and of the heavy grinding action between the individual particles of the cement due to such balls, tends very effectively to prevent the formation of any such envelops. By the means described, i. e., by the constant return of elevated material to the rear of the balls 2, the material within the ball races is subjected to a grinding action, again and again, as well as to a thorough mixing action, bringing the water in the ball races into intimate contact with the individual particles of the cement, until finally, by means to be described presently, the mixture within the ball races is discharged.

As will be understood readily, the two ball races are intended to be charged and emptied in alternation. For the emptying of the ball races, swinging flap valves 7 are provided between a branch chute 6 and the double chute 5; these valves being arranged, as shown in Fig. 5, so that either of these valves may be set at will to cause the material flowing through the corresponding channel of chute 5 to pass into chute 6, and thence outward.

For the charging of the two ball races, a charging chute 8 is provided, which passes through the central opening of the double ball mill into the interior of a main mixer 13 which we have indicated as connected, directly and mechanically, to the structure comprising the two ball races 1, which mixer 13 is of any usual or ordinary construction of concrete mixer. It will be understood, of course, that the hydrator comprising the two ball races 1 is not necessarily formed as a structural part of a concrete mixer; though such united construction may at times be convenient. As shown particularly in Fig. 6, two other chutes 9 and 9ª are provided alongside chute 8, together with a flap valve 10, which by its position, determines whether material shall pass down to chute 9, or shall pass down the chute 9ª. The chute 9 discharges into ball race 1, and the chute 9ª discharges into ball race 1ª. The ball mill is provided with spray pipes 11, one arranged to spray water into ball race 1, the other to spray water into ball race 1ª, and a three-way valve 12 is provided, whereby water may be turned into the one ball race or the other.

We have not illustrated the rotary mounting for the structure comprising the ball races 1 and 1ª, but it will be understood that such structure is mounted in the manner usual for such structures, and is rotated by suitable power means, as is customary in the case of such structures.

The operation of this apparatus is as follows: In starting the hydrator in operation, the ball races are put in rotation and a suitable charge of cement is deposited, through one or the other of the chutes 9 or 9ª, into the corresponding ball race 1 or 1ª, and water is admitted into that ball race which has thus received a charge of cement. The amount of water should, for the best results, be not more than sufficient to produce the described creamy fluid mass. As previously explained, the action of the crusher balls 2 upon the material thus contained in one of the ball races is to thoroughly mix the cement and water, to grind off the hydrated surface of the individual cement particles or break them up so as to expose the inner portions for hydration, to break up any envelops which may form; also to break up any aggregates or lumps which may form, the result being a very thoroughly hydrated cement.

After the first minute of treatment in the first ball race, the second ball race is charged, and after the treatment in the first ball race is continued for about two minutes that ball race is emptied and recharged; thereafter the emptying and recharging of the ball races proceeds in alternation. When, as indicated in the drawings, a concrete mixer 13 is united with the hydrator, this mixer receives its charge of rock and sand through the chute 8 at the same time that one or the other of the ball races receives its charge of cement through one or the other of the chutes 9 and 9ª; and in such case as each charge of sand and rock passes into the mixer 13 it encounters a charge of hydrated cement discharged into that mixer 13 from one or the other of the two ball races. So greatly is hydration hastened by this operation that a treatment of two minutes or thereabout in the ball race is sufficient for the hydration of the cement to a very marked degree, producing the mixture of creamy consistence above referred to.

It will be obvious to those skilled in the art, after understanding our invention, that certain benefits of the invention may be obtained without practising the same according to the preferred method herein stated, and we aim in the appended claims to cover all features within the spirit and scope of our invention.

Having thus described our invention, what we claim as new and desire to secure by Letters Patent, is:—

1. The method of treating a water-reacting cement for the utilization of same, to hasten the hydration of the same, which consists in subjecting the cement, while in mixture with sufficient water to hydrate the same, to a heavy grinding action, whereby the cement particles are reduced in the presence of water and any lumps or envelops which may have formed are broken up.

2. The method of treating a water-reacting cement for the utilization of the same, to hasten hydration of the cement, which consists in hydrating the cement by subjecting it to energetic attrition in the presence of water and without any substantial amount of aggregate the particles of which are of the same order of magnitude as or of a greater order of magnitude than the usual broken stone for concrete mixtures.

3. The method of treating a water-reacting cement for the utilization of the same, to obtain an improved hydration of the same, which consists in hydrating the cement by subjecting it to energetic attrition in the presence of water, and continuing such attrition until the cement and water have been so united that there is formed a somewhat viscous, liquid smooth mass of creamy fluidity and consistency.

4. The method of treating a water-reacting cement for the utilization of the same, which consists in subjecting the cement, while in contact with water, to a heavy grinding action, and continuing such grinding until a somewhat viscous, liquid smooth mass of cream-like consistency is produced.

5. The method of treating a water-reacting cement for the utilization of the same, which consists in subjecting the cement to violent attrition in the presence of water until the cement has been hydrated to a marked degree.

6. The method of treating a water-reacting cement for the utilization of the same, which consists in hydrating the cement to a marked degree in the presence of not substantially more than enough water to produce a resulting liquid mass of creamy fluidity and consistency, such hydration being accomplished by subjecting the cement to energetic attrition.

7. The method of treating a water-reacting cement for the utilization of the same, to hasten hydration of the same, which consists in hydrating the cement by subjecting it to violent attrition in the presence of not substantially more water than sufficient to form, when the attrition is completed, a heavy-bodied liquid, and continuing such attrition until the cement and water have been so united that there is formed a somewhat viscous, liquid smooth mass.

8. The method of making concrete which consists in hydrating the cement by subjecting it to violent attrition in the presence of not substantially more water than sufficient to form, when the attrition is completed, a somewhat viscous liquid of creamy fluidity, and continuing such attrition until the cement and water have been so united that there is formed a somewhat viscous, liquid smooth mass, and after forming such liquid mixture then mixing the same with the aggregates of concrete such as sand and stone, so as to coat the surface thereof with such mixture, whereby concrete is formed in which the aggregate is more uniformly coated with the cementitious products of the hydration and is more firmly and uniformly held in suspension than in the usual cement concrete mixing process.

9. A heavy bodied mixture of the colloidal and crystalloidal products of cement hydration in combined aqueous solution and suspension, the mixture being of creamy consistency and having the property of taking an initial set in from one to four hours after production, and of subsequently becoming rigid, that is, of taking a final set.

10. A heavy bodied mixture of the colloidal and crystalloidal products of cement hydration in combined aqueous solution and suspension, the mixture being of creamy consistency and of sufficient density to hold in suspension sand and small rock particles.

11. A more or less liquid concrete mixture comprising a mixture of colloidal and crystalloidal products of cement hydration in combined aqueous solution and suspension and itself of sufficient density to hold in suspension sand and small rock particles, such mixture being combined with sand and small rock particles, and as a result of such combination having a density sufficient to hold in suspension larger rock particles, which larger rock particles are also present in the mixture.

12. A heavily bodied hydrated cement comprising cement hydrated with substantial uniformity to between 50 and 95 per cent. of complete hydration and having the property of taking an initial set in from one to four hours after production, and of subsequently becoming rigid, that is, of taking a final set.

13. A cement construction comprising cement that was hydrated by being subjected to violent attrition in the presence of water until a somewhat viscous, liquid smooth mass of creamy fluidity and consistency was formed, and also comprising an aggregate that was mixed and coated with such smooth mass of cement.

14. A cement construction comprising cement that was hydrated by being subjected to forceful grinding in the presence of water until the cement was hydrated to over 50 per cent. of complete hydration.

15. A cement construction, the cement in adjacent portions of which has been substantially uniformly hydrated and to a marked degree, and the aggregates in the same portions of which have been coated with such hydrated cement to a marked degree of uniformity, whereby the strength of the construction is increased and made more uniform.

16. The method of treating a water-reacting cement for the utilization of the same, which consists in subjecting the cement to not substantially more water than sufficient to form a heavy-bodied liquid of the two when thoroughly mixed, and acting on the cement and water so as to separate the cement particles and mix them with the water to the extent of forming a somewhat viscous, liquid smooth mass, such action being sufficiently violent to effect such mixture within a sufficiently short time to avoid the formation of colloidal and other products which would unduly delay the setting of the mixture.

In testimony whereof, we have signed our names to this specification.

CLOYD M. CHAPMAN.
NATHAN C. JOHNSON.

Copies of this patent may be obtained for five cents each, by addressing the "Commissioner of Patents, Washington, D. C."